US011132745B2

(12) United States Patent
Aggarwal (10) Patent No.: US 11,132,745 B2
(45) Date of Patent: *Sep. 28, 2021

(54) FINANCIAL ASSET SYSTEM AND METHOD FOR PROVIDING FINANCIAL ASSET TO A USER

(71) Applicant: Tushar Aggarwal, Green Cove Springs, FL (US)

(72) Inventor: Tushar Aggarwal, Green Cove Springs, FL (US)

( * ) Notice: Subject to any disclaimer, the term of this patent is extended or adjusted under 35 U.S.C. 154(b) by 117 days.

This patent is subject to a terminal disclaimer.

(21) Appl. No.: 15/979,280

(22) Filed: May 14, 2018

(65) Prior Publication Data

US 2019/0347720 A1    Nov. 14, 2019

(51) Int. Cl.
*G06Q 40/02* (2012.01)
*G06Q 50/26* (2012.01)
*G06Q 20/40* (2012.01)

(52) U.S. Cl.
CPC .......... *G06Q 40/025* (2013.01); *G06Q 20/40* (2013.01); *G06Q 50/265* (2013.01)

(58) Field of Classification Search
CPC ............. G06Q 10/06398; G06Q 30/02; G06Q 40/025; G06Q 40/02
See application file for complete search history.

(56) References Cited

U.S. PATENT DOCUMENTS

| 2003/0018558 | A1* | 1/2003 | Heffner | G06Q 40/02 705/37 |
| 2008/0065467 | A1 | 3/2008 | Nyegaard | |
| 2010/0042520 | A1* | 2/2010 | Rose | G06Q 20/108 705/30 |
| 2015/0339769 | A1* | 11/2015 | deOliveira | G06Q 40/025 705/38 |

(Continued)

FOREIGN PATENT DOCUMENTS

| IN | 201641006117 A | 11/2017 |
| KR | 20140034958 A | 3/2014 |

(Continued)

OTHER PUBLICATIONS

Lin, Judging Borrowers by the Company They Keep: Friendship Networks and Information Asymmetry in Online Peer-to-Peer Lending, vol. 59, No. 1, Jan. 2013, pp. 17-35.*

(Continued)

*Primary Examiner* — Richard C Weisberger
(74) *Attorney, Agent, or Firm* — Kolisch Hartwell, P.C.

(57) ABSTRACT

The present disclosure provides a system and method for providing financial asset to a user in real time. The system receives and validates a first set of data, a second set of data and a third set of data associated with the user. Also, the system obtains a fourth set of data associated with a portable communication device. Further, the system creates a user profile of the user. Further, the system triggers a camera to capture the real-time image of the user based on the verifi- (Continued)

cation of the third set of data and the fourth set of data. The real-time image of the user is mapped with image of the user obtained from the user profile. In addition, the system collects one or more modes of transfer of financial asset from the user. The system credits financial asset to the user.

18 Claims, 4 Drawing Sheets

(56) References Cited

U.S. PATENT DOCUMENTS

| | | | |
|---|---|---|---|
| 2016/0142397 A1* | 5/2016 | Froelich | G06Q 10/10 726/3 |
| 2017/0103456 A1* | 4/2017 | Parsells | G06Q 40/025 |
| 2017/0109620 A1 | 4/2017 | Wurmfeld et al. | |
| 2018/0082371 A1 | 3/2018 | Chandler | |
| 2019/0075097 A1 | 3/2019 | Campbell | |
| 2019/0102835 A1 | 4/2019 | Bjonerud et al. | |
| 2019/0311102 A1* | 10/2019 | Tussy | G06F 21/32 |
| 2019/0347719 A1 | 11/2019 | Aggarwal | |
| 2019/0347721 A1 | 11/2019 | Aggarwal | |

FOREIGN PATENT DOCUMENTS

| | | | | |
|---|---|---|---|---|
| RU | 2589385 C2 | 7/2016 | | |
| WO | 0115047 A1 | 3/2001 | | |
| WO | 2015136503 A1 | 9/2015 | | |
| WO | WO-2015136503 A1 * | 9/2015 | | G06Q 40/02 |

OTHER PUBLICATIONS

Face Recognition Technology: A Review Jagdish Chandra Joshi* and K K Gupta** (Year: 2015).*

* cited by examiner

FINANCIAL ASSET SYSTEM AND METHOD FOR PROVIDING FINANCIAL ASSET TO A USER

TECHNICAL FIELD

The present disclosure relates to a field of financial asset system. More specifically, the present disclosure relates to a method and system for providing a financial asset to a user.

BACKGROUND

Financial institutions provide financial asset to individuals, businesses and the like. The financial asset includes personal loan, home loan, student loan, business loan, credit cards, and the like. Generally, the financial institutions receive a request from a borrower for borrowing the financial asset. The financial institutions perform a background check of the borrower for verification. The verification is performed to identify if the borrower is capable of repaying the financial asset. The background check is performed based on the limited personal and banking information furnished with the request for the financial asset. The financial asset is approved by the financial institutions for the borrower after verifying the borrower. Sometimes, the borrower provides fabricated information in order to get the financial asset. The fabricated information provided by the borrower passes the background check performed by the financial institutions. The background check performed by the financial institution does not prove to be effective for identifying if a person is capable to repay the financial asset. The background check performed by the financial institution is limited to the information provided by the borrower. In many cases, the financial institutions have to resort to other means for compensating for the amount associated with the financial asset. In one example, the financial institutions seize property or any other tangible asset of the borrower for repayment of the financial asset. There is a constant need to improve the verification process for avoiding loss incurred by the financial institutions.

SUMMARY

In a first example, a computer-implemented method is provided. The computer-implemented method provides one or more modes of transfer of financial asset to a user based on verification of profile of the user. The method includes a first step of receiving a first set of data at a financial asset system. The first set of data is associated with demographic information of the user. The method includes another step of validating the first set of data associated with demographic information of the user at the financial asset system. The method includes yet another step of collecting a second set of data at the financial asset system. The second set of data is associated with professional information of the user. The method includes yet another step of verifying the second set of data associated with the user at the financial asset system. The method includes yet another step of collecting a third set of data associated with the user at the financial asset system. The method includes yet another step of validating the third set of data associated with the user at the financial asset system. The method includes another step of obtaining a fourth set of data associated with the portable communication device of the user at the financial asset system. The method includes another step of creating a user profile of the user at the financial asset system. The method includes a signal generator circuitry embedded inside the portable communication device for generating a signal at the financial asset system. The method includes yet another step of mapping the real-time image of the user with image of the user obtained from the user profile at the financial asset system. The method includes another step of collecting the one or more modes of transfer of the financial asset from the user at the financial asset system. The method includes yet another step of crediting the financial asset to the user at the financial asset system. The first set of data is received from a mobile application installed inside a portable communication device. The portable communication device is associated with the user. The validation is done by mapping the first set of data with data of the user obtained from one or more web-based platform. The validation is done in real time. The second set of data is collected from the mobile application installed inside the portable communication device. The portable communication device is associated with the user. The verification is done by mapping the second set of data with data of the user obtained from the one or more web-based platform. The verification is done in real time. The third set of data is banking information of the user. The third set of data is collected from the mobile application installed inside the portable communication device. The portable communication device is associated with the user. The validation is done by mapping the third set of data with data of the user obtained from the one or more web-based platform. The validation is done in real time. The fourth set of data is obtained to determine financial status of the user in real-time. The user profile is created based on the first set of data, the second set of data, the third set of data, the fourth set of data and data of the user obtained from the one or more web-based platform. The user profile is created in real time. The signal is generated for triggering a camera associated with the portable communication device. The camera is triggered after the verification of the third set of data and the fourth set of data to capture the real-time image of the user. The mapping is done in real time for verifying the user. The one or more modes of transfer is collected after verification of the user and approval of the financial asset. The one or more modes of transfer of the financial asset is collected from the mobile application installed inside the portable communication device. The portable communication device is associated with the user. The financial asset is credited based on the collected data associated with the one or more modes of transfer of the financial asset. The crediting is done in real time using a secured connection.

In an embodiment of the present disclosure, the first set of data comprises demographic information of the user, wherein the demographic information comprises name, last name, age, gender, father name, mother name, mobile number, address, e-mail address, and nationality of the user.

In an embodiment of the present disclosure, wherein the second set of data being associated with the professional information of the user, wherein the professional information comprises occupation, current designation, company details, salary details, experience and passport information associated with the user.

In an embodiment of the present disclosure, the third set of data being associated with the banking information of the user, wherein the banking information comprises bank account details, number of bank accounts associated with the user, number of credit cards, number of debit cards, value of financial asset required by the user, rate of interest, and time duration of repayment of the financial asset.

In an embodiment of the present disclosure, wherein the fourth set of data comprises device model, processor, RAM, operating system, IMEI number, IP address, MAC address and GPS data associated with the portable communication device of the user.

In an embodiment of the present disclosure, the financial asset system with the processor identifies one or more user connected devices based on the fourth set of data associated with the portable communication device. The identification is done in real time.

In an embodiment of the present disclosure, the financial asset system with the processor analyzes the one or more user connected devices and the fourth set of data. The analyzing is done to identify the financial status of the user. The financial status is identified for the approval of the financial asset to the user.

In an embodiment of the present disclosure, the financial asset system with the processor normalizes the image obtained from the user profile or the real-time image. The normalization is done based on the features of the portable communication device. The normalizing is done in real time.

In a second example, a computer system is provided. The computer system includes one or more processors and a memory. The memory is coupled to the one or more processors. The memory stores instructions. The instructions are executed by the one or more processors. The execution of instructions causes the one or more processors to perform a method to provide one or more modes of transfer of financial asset to a user based on verification of profile of the user. The method includes a first step of receiving a first set of data at a financial asset system. The first set of data is associated with demographic information of the user. The method includes another step of validating the first set of data associated with demographic information of the user at the financial asset system. The method includes yet another step of collecting a second set of data at the financial asset system. The second set of data is associated with professional information of the user. The method includes yet another step of verifying the second set of data associated with the user at the financial asset system. The method includes yet another step of collecting a third set of data associated with the user at the financial asset system. The method includes yet another step of validating the third set of data associated with the user at the financial asset system. The method includes another step of obtaining a fourth set of data associated with the portable communication device of the user at the financial asset system. The method includes another step of creating a user profile of the user at the financial asset system. The method includes a signal generator circuitry embedded inside the portable communication device for generating a signal at the financial asset system. The method includes yet another step of mapping the real-time image of the user with image of the user obtained from the user profile at the financial asset system. The method includes another step of collecting the one or more modes of transfer of the financial asset from the user at the financial asset system. The method includes yet another step of crediting the financial asset to the user at the financial asset system. The first set of data is received from a mobile application installed inside a portable communication device. The portable communication device is associated with the user. The validation is done by mapping the first set of data with data of the user obtained from one or more web-based platform. The validation is done in real time. The second set of data is collected from the mobile application installed inside the portable communication device. The portable communication device is associated with the user. The verification is done by mapping the second set of data with data of the user obtained from the one or more web-based platform. The verification is done in real time. The third set of data is banking information of the user. The third set of data is collected from the mobile application installed inside the portable communication device. The portable communication device is associated with the user. The validation is done by mapping the third set of data with data of the user obtained from the one or more web-based platform. The validation is done in real time. The fourth set of data is obtained to determine financial status of the user in real-time. The user profile is created based on the first set of data, the second set of data, the third set of data, the fourth set of data and data of the user obtained from the one or more web-based platform. The user profile is created in real time. The signal is generated for triggering a camera associated with the portable communication device. The camera is triggered after the verification of the third set of data and the fourth set of data to capture the real-time image of the user. The mapping is done in real time for verifying the user. The one or more modes of transfer is collected after verification of the user and approval of the financial asset. The one or more modes of transfer of the financial asset is collected from the mobile application installed inside the portable communication device. The portable communication device is associated with the user. The financial asset is credited based on the collected data associated with the one or more modes of transfer of the financial asset. The crediting is done in real time using a secured connection.

In a first example, a computer readable storage medium is provided. The computer readable storage medium enables encoding of computer executable instructions. The computer executable instructions when executed by at least one processor perform a method. The at least one processor performs the method to provide one or more modes of transfer of financial asset to a user based on verification of profile of the user. The method includes a first step of receiving a first set of data at a financial asset system. The first set of data is associated with demographic information of the user. The method includes another step of validating the first set of data associated with demographic information of the user at the financial asset system. The method includes yet another step of collecting a second set of data at the financial asset system. The second set of data is associated with professional information of the user. The method includes yet another step of verifying the second set of data associated with the user at the financial asset system. The method includes yet another step of collecting a third set of data associated with the user at the financial asset system. The method includes yet another step of validating the third set of data associated with the user at the financial asset system. The method includes another step of obtaining a fourth set of data associated with the portable communication device of the user at the financial asset system. The method includes another step of creating a user profile of the user at the financial asset system. The method includes a signal generator circuitry embedded inside the portable communication device for generating a signal at the financial asset system. The method includes yet another step of mapping the real-time image of the user with image of the user obtained from the user profile at the financial asset system. The method includes another step of collecting the one or more modes of transfer of the financial asset from the user at the financial asset system. The method includes yet another step of crediting the financial asset to the user at the financial asset system. The first set of data is received from a mobile application installed inside a portable communication device. The portable communication device is associated with the user. The validation is done by mapping the first set of data with data of the user obtained from one or more web-based platform. The validation is done in real time. The second set of data is collected from the mobile application installed inside the portable communication device. The portable communication device is associated with the user. The verification is done by mapping the second set of data with data of the user obtained from the one or more web-based platform. The verification is done in real time. The third set of data is banking information of the user. The third set of data is collected from the mobile application installed inside the portable communication device. The portable communication device is associated with the user. The validation is done by mapping the third set of data with data of the user obtained from the one or more web-based platform. The validation is done in real time. The fourth set of data is obtained to determine financial status of the user in real-time. The user profile is created based on the first set of data, the second set of data, the third set of data, the fourth set of data and data of the user obtained from the one or more web-based platform. The user profile is created in real time. The signal is generated for triggering a camera associated with the portable communication device. The camera is triggered after the verification of the third set of data and the fourth set of data to capture the real-time image of the user. The mapping is done in real time for verifying the user. The one or more modes of transfer is collected after verification of the user and approval of the financial asset. The one or more modes of transfer of the financial asset is collected from the mobile application installed inside the portable communication device. The portable communication device is associated with the user. The financial asset is credited based on the collected data associated with the one or more modes of transfer of the financial asset. The crediting is done in real time using a secured connection.

BRIEF DESCRIPTION OF THE FIGURES

Having thus described the invention in general terms, reference will now be made to the accompanying drawings, which are not necessarily drawn to scale, and wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1:
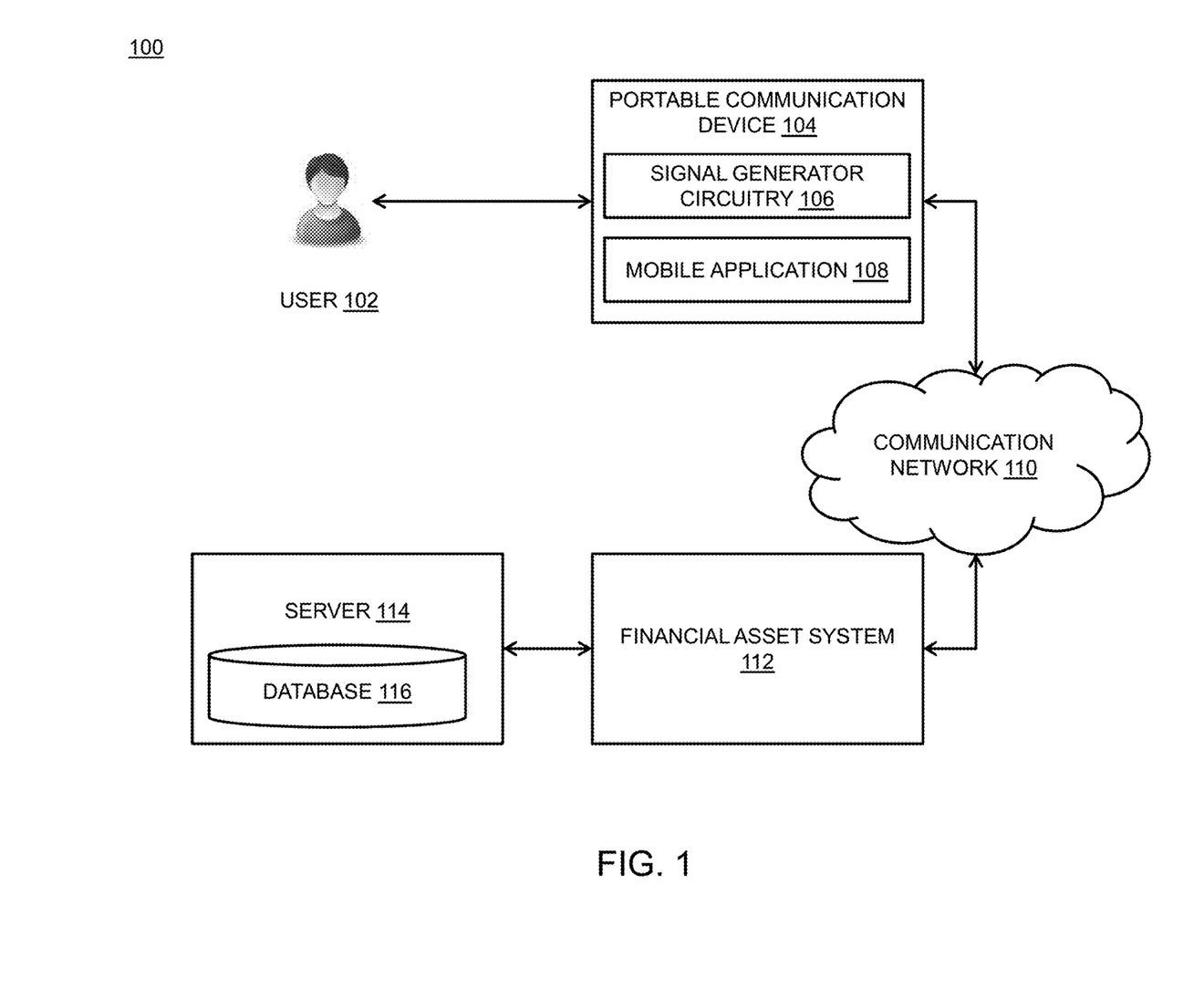
FIG. 1 illustrates an interactive computing environment for providing financial asset to a user, in accordance with various embodiments of the present disclosure.

FIG. 1 illustrates a general overview of an interactive computing environment 100 for providing a financial asset to user, in accordance with various embodiments of the present disclosure. The interactive computing environment 100 includes a user 102, a portable communication device 104, a signal generator circuitry 106, a mobile application 108, a communication network 110, a financial asset system 112, a server 114 and a database 116.

The interactive computing environment 100 includes the portable communication device 104. The portable communication device 104 is associated with the user 102. The user 102 is any person who wants to apply for the financial asset. The portable communication device 104 is any mobile device which mainly comprises a camera and network connectivity. The user 102 installs the mobile application 106 on the portable communication device 104. The user 102 provides data to the mobile application 108 through the portable communication device 104.

In general, the financial asset is a non-physical asset whose value is derived from a contractual claim such as bank deposits, bonds, and stocks. The term financial asset here refers to help in the form of money. The financial asset refers to a loan taken from banks by people who are in the need of money. The financial asset may be availed by any persons, objects, businesses and the like and not just an individual. The loans may be provided in a plurality of forms which includes personal loan, home loan, student loan and the like.

In addition, the mobile application 108 provides an interface to the user 102 to request for the financial asset. Further, the portable communication device 104 is connected to the communication network 110. The communication network 110 provides a medium to the portable communication device 104 to connect to the financial asset system 112. Also, the communication network 110 provides network connectivity to the portable communication device 104. In an example, the communication network 110 uses protocol to connect the portable communication device 104 to the financial asset system 112. The communication network 110 connects the portable communication device 104 to the financial asset system 112 using a plurality of methods. The plurality of methods used to provide network connectivity to the portable communication device 104 includes 2G, 3G, 4G, Wifi and the like.

The interactive computing environment 100 includes the financial asset system 112. The financial asset system 112 provides the financial asset to the user 102. The financial asset system 112 is responsible for computing operations performed by the interactive computing environment 100. The financial asset system 112 receives data from the user 102 as input. The financial asset system 112 performs validation and processing on received data and calculates the value of the financial asset to be credited to the user 102. In addition, the financial asset system 112 provides one or more modes of transfer of the financial asset to the bank account of the user 102. Also, the financial asset system 112 is connected with the server 114. The server 114 is connected with the database 116.

The financial asset system 112 receives a first set of data associated with the user 102 in real time. The first set of data includes demographic information of the user 102. The demographic information is received from the mobile application 108 installed in the portable communication device 104. The first set of data is sent through the communication network 110. In an example, the user 102 opens up a first page in the mobile application 108 on the portable communication device 104. The mobile application 108 includes a format to receive data from the user 102. The format includes but may not be limited to a form and table. Further, the information is entered by the user 102 using the mobile application 108 installed inside the portable communication device 104.

The demographic information of the user 102 includes personal information of the user 102. The personal information includes but may not be limited to name, last name, age, gender, father name, mother name, mobile number, address, e-mail address and nationality of the user 102.

The financial asset system 112 validates the first set of data associated with the demographic information of the user 102. The first set of data is mapped with data of the user 102 obtained from one or more web-based platform. Further, the first set of data is validated with data of the user 102 obtained from the one or more web-based platform in real time. In an example, the mobile application 108 receives the first set of data entered by the user 102 through the mobile application 108 installed on the portable communication device 104. The financial asset system 112 matches the first set of data with data of the user 102 on the one or more web based platform in real time.

The financial asset system 112 collects a second set of data associated with the user 102. The second set of data includes professional information of the user 102. The second set of data is received through the mobile application 108 installed on the portable communication device 104. The second set of data is sent through the communication network 110. In an example, the mobile application 108 opens up a second page in the mobile application 108 on the portable communication device 104. The mobile application 108 includes a format to receive data from the user 102. The format includes but may not be limited to a form and table. Further, the information is entered by the user 102 using the mobile application 108 installed on the portable communication device 104.

The second set of data includes professional information of the user 102. The professional information of the user 102 includes but may not be limited to occupation, current designation, company details, salary details, experience and passport information associated with the user 102.

The financial asset system 112 verifies the second set of data associated with the user 102. The second set of data is mapped with data of the user 102 obtained from the one or more web-based platform. Further, the second set of data is verified with the data of the user 102 obtained from the one or more web-based platform in real time. In an example, the mobile application 108 receives the second set of data entered by the user 102 through the mobile application 108 in the portable communication device 104. The financial asset system 112 matches the second set of data with the data of the user 102 on the one or more web based platform in real time.

The financial asset system 112 collects a third set of data associated with the user 102. The third set of data includes banking information of the user 102. In addition, the third set of data provides information about the bank account of the user 102. The third set of data is collected from the mobile application 108 installed inside the portable communication device 104. The third set of data is sent through the communication network 110. In an example, the mobile application 108 opens up a third page in the mobile application 108 of the portable communication device 104. The mobile application 108 includes a format to receive data from the user 102. The format includes but may not be limited to a form and table. Further, the information is entered by the user 102 using the mobile application 108 installed on the portable communication device 104.

The banking information includes bank account details, number of bank accounts associated with the user 102, number of credit cards and number of debit cards. In addition, the banking information includes the value of financial asset required by the user 102, the rate of interest and time duration of repayment of the financial asset.

Further, the financial asset system 112 validates the third set of data associated with the user 102. The third set of data is mapped with data of the user 102 obtained from the one or more web-based platform. The validation is done to confirm that the user 102 has provided all the correct information. Also, the third set of data is validated to assure that the user 102 is capable to repay the value of the financial asset to be credited to the user 102. The third set of data is validated with the data of the user 102 obtained from the one or more web-based platform in real time. In an example, the mobile application 108 receives the third set of data entered by the user 102 through the mobile application 108 in the portable communication device 104. The financial asset system 112 matches the third set of data with the data of the user 102 on the one or more web based platform in real time.

In an embodiment of the present disclosure, the one or more web-based platform includes Facebook, Instagram, WhatsApp, Linkedin, Twitter, Gmail, Yahoo, Orkut and the like. In an example, the financial asset system 112 maps information of the user 102 from the first set of data, the second set of data and the third set of data with the data of the user 102 obtained from the one or more web-based platform. The mapping of data is done in real time.

In an embodiment of the present disclosure, the financial asset system 112 obtains a fourth set of data associated with the portable communication device 104 of the user 102. The fourth set of data includes device model, processor, RAM, operating system, IMEI number, IP address, MAC address and GPS data associated with the portable communication device 104 of the user 102. The financial asset system 112 collects the fourth set of data to predict the financial status of the user 102. In an example, the fourth set of data such as device model may be used to predict the financial status of the user 102. The user 102 having the portable communication device 104 of higher brand value may be considered to have a better financial status. The IMEI number of the portable communication device 104 may be utilized to predict the ownership of the user 102.

Further, the financial asset system 112 creates a user profile of the user 102. The user profile is created based on the first set of data, the second set of data, the third set of data, the fourth set of data and data of the user 102 obtained from the one or more web-based platform. The user profile of the user 102 is created in real time. In an example, the financial asset system 112 collects personal information, professional information, banking information, data of the portable communication device 104 and the data of the user 102 obtained from the one or more web-based platform in real time. Further, the data is analyzed on the server 114. The data is analyzed to generate the user profile of the user 102. The user profile is stored in the database 116.

Further, the interactive computing environment 100 comprises a signal generator circuitry 106 embedded inside the portable communication device 104. The signal generator circuitry 106 generates a signal for the portable communication device 104 for triggering a camera associated with the portable communication device 104. The camera associated with the portable communication device 104 captures a real-time image of the user 102.

Further, the financial asset system 112 maps the real-time image of the user 102 with image of the user 102 obtained from the user profile. The mapping of the real-time image of the user 102 with image of the user 102 obtained from the user profile is done in real time to verify the user 102. In an embodiment of the present disclosure, the verification of the real-time image of the user 102 is done only after the verification of the third set of data and the fourth set of data.

Furthermore, the financial asset system 112 collects the one or more modes of transfer of the financial asset from the user 102. The one or more modes of transfer of the financial asset are collected from the mobile application 108 installed inside the portable communication device 104. The portable communication device 104 is associated with the user 102. In an embodiment of the present disclosure, the financial asset system 112 collects the one or more modes of transfer of the financial asset from the user 102 after calculation of the value of the financial asset to be credited to the user 102. The financial asset system 112 calculates the value of the financial asset based on machine learning algorithm in real time. The financial asset system 112 analyzes the user profile to calculate the value of the financial asset to be credited to the user 102. In an example, the value of the financial asset is calculated such that the user 102 is able to repay the value of the financial asset on time. Also, the financial asset system 112 displays the one or more modes of transfer for the financial asset to the user 102. The value of the financial asset and the one or more modes of transfer of the financial asset are displayed in the mobile application 108 installed inside the portable communication device 104. In another embodiment of the present disclosure, the financial asset system 112 displays the one or more modes of transfer of the financial asset only after approval of value of the financial asset from the user 102.

Further, the user 102 selects the one or more modes of transfer of the financial asset on the mobile application 108 installed inside the portable communication device 104. The one or more modes of transfer of the financial asset include but may not be limited to bank account, digital wallet.

The financial asset system 112 credits the financial asset to the user 102. The financial asset is credited based on the collected data associated with the one or more modes of transfer of the financial asset. The financial asset system 112 credits the financial asset using a secured connection. The financial asset system 112 credits the financial asset to the bank account of the user 102 using a secured connection. The details of bank account of the user 102 are obtained from the user profile stored in the database 116.

The financial asset system 112 credits value of the financial asset directly to the bank account of the user 102. The financial asset system 112 performs analyses of data provided by the user 102 when the mode of transfer is selected as the bank account. The financial asset system 112 analyses data present in the database 116. The financial asset system 112 analyses data to check that information provided by the user 102 is correct. The data present in the user profile of the user 102 is matched with information provided in banking information of the user 102. In addition, the financial asset system 112 establishes the secured connection to payment gateway. The payment gateway provides the secured connection to transfer value of the financial asset to the bank account of the user 102.

Further, the interactive computing environment 100 includes the server 114. The server 114 is a cloud server. In general, the cloud server possesses and exhibit similar capabilities and functionality to the server 114 but is accessed remotely from a cloud service provider. In an example, the server 114 is similar to a physical server but provides virtual space for handling all the operations.

Further, the server 114 includes the database 116. The database 116 is a cloud database. The database 116 provides a storage location for the user profile, the set of data and information of the user 102 used by the interactive computing environment 100. In an example, the database 116 is connected to the server 114. The server 114 stores data in the database 116. The server 114 interacts with the database 116 to retrieve the stored data.

In an embodiment of the present disclosure, the financial asset system 112 identifies the user connected devices based on the fourth set of data associated with the portable communication device 104. The user connected devices help to predict the financial status of the user 102. The financial asset system 112 collects information about the user connected devices as devices are synchronized with one another. In an example, the user 102 has three devices connected to the portable communication device 104. The fourth set of data includes the brand value of all the three devices associated with the user 102. The financial status of the user 102 is predicted based on the brand value of all the connected devices associated with the user 102.

In another embodiment of the present disclosure, the financial asset system 112 collects the third set of data to determine financial status of the user 102. The financial asset system 112 uses hardware run machine learning algorithm in real time. The financial asset system 112 analyzes the third set of data stored in the database 116. In an example, the financial asset system 112 analyzes salary of the user 102 to predict the ability of the user 102 to repay the financial asset.

In an embodiment of the present disclosure, the plurality of images of the user 102 available on the one or more web-based platform is analyzed to select image to be stored in the user profile in real time. In addition, the financial asset system 112 verifies the real-time image of the user 102 with the image present in the user profile stored in the database 116. The real-time image of the user 102 is verified to validate the authenticity of the user 102 who applies for the financial asset. In an example, any other person might try to apply for the financial asset on the behalf of the user 102. The information of the user 102 might be easily stolen from the one or more web-based platform by any other person. Further, the person might misuse the information to apply for the financial asset. The verification of the real-time image of the user 102 authenticates the user 102 applying for the financial asset.

In an embodiment of the present disclosure, the financial asset system 112 analyzes the plurality of images of the user 102 available on the one or more web-based platform. The financial asset system 112 selects and stores image of the user 102 in the user profile on the database 116. In an embodiment of the present disclosure, the financial asset system 112 analyzes the plurality of images present on the one or more web-based platform which are captured with front facing camera of the portable communication device 104 of the user 102. The financial asset system 112 recognizes the plurality of images which are captured with front facing camera of the portable communication device 104 using hardware run algorithm. The financial asset system 112 selects and stores image of the user 102 in the user profile on the database 116. Further, the financial asset system 112 verifies the real-time image of the user 102 with image stored in the user profile stored in the database 116.

In another embodiment of the present disclosure, the financial asset system 112 excludes the plurality of images during mapping which contains a plurality of faces in the image of the user 102 on the one or more web-based platform. The financial asset system 112 recognizes the plurality of images which contains the plurality of faces. Further, the financial asset system 112 excludes the plurality of images during analysis to select image for the user profile.

In another embodiment of the present disclosure, the financial asset system 112 excludes the plurality of images of the user 102 during mapping which are captured in low light on the one or more web-based platform. The financial asset system 112 recognizes the plurality of images of the user 102 which are taken in low light. Further, the financial asset system 112 excludes the plurality of images during analysis to select image for the user profile.

In an embodiment of the present disclosure, the financial asset system 112 verifies the real-time image of the user 102 based on specifications of image stored in the user profile on the database 116. The financial asset system 112 normalizes a plurality of parameters related to the specifications of the camera of the portable communication device 104. The quality of the real-time image captured with the camera of the portable communication device 104 is matched with the quality of image of the user 102 stored in the user profile. The financial asset system 112 verifies authenticity of the user 102 applying for the financial asset. The financial asset system 112 maps the real-time image of the user 102 with image present on the user profile of the user 102 which have been captured with the camera having similar specifications. The specifications are normalized to a general value to map the specifications of the camera of the portable communication device 104 to a little amount of tolerance.

In another embodiment of the present disclosure, the financial asset system 112 selects the plurality of images of the user 102 available on the one or more web-based platform to be stored in the user profile on the database 116. The financial asset system 112 analyzes and stores the plurality of images in the user profile on the database 116.

In an embodiment of the present disclosure, the financial asset system 112 triggers the camera of the portable communication device 104. The camera of the portable communication device 104 is triggered only after the verification of the third set of data and the fourth set of data. In an example, the financial asset system 112 prevents triggering of the camera of the portable communication device 104 if the information provided by the user 102 is a mismatch.

In an embodiment of the present disclosure, the financial asset system 112 verifies identity of the user 102 on the basis of properties of the real-time image and image of the user 102 present on the one or more web-based platform. In an example, the financial asset system 112 analyzes the real-time image of the user 102 with image of the user 102 present on the web-based platform. The financial asset system 112 recognizes the properties of the images which are captured from the front-facing camera of the portable communication device 104. The quality of the images is then matched. The financial asset system 112 uses a hardware run machine learning algorithm to match the properties of the real-time image and image of the user 102 present in the one or more web-based platform. There may be a tolerance of few percentages in the camera parameters. The financial asset system 112 displays value of the financial asset only after successful verification of the user 102.

In an embodiment of the present disclosure, the financial asset system 112 collects the next set of data only after verification of the previous set of data. In an example, financial asset system 112 does not accept the second set of data if the user 102 enters the first set of data incorrectly. Also, the financial asset system 112 does not accept the third set of data if the user 102 enters the second set of data incorrectly. Also, the financial asset system 112 does not provide value of the financial asset to the user 102 until the real-time image of the user 102 is verified with the image stored in the database 116.

In an embodiment of the present disclosure, the user profile of the user 102 is created based on the first set of data, the second set of data, the third set of data, the fourth set of data and data from the one or more web-based platform. The user profile is stored in the database 116.

In an embodiment of the present disclosure, the financial asset system 112 normalizes image obtained from the user profile or the real-time image of the user 102. The normalization is done based on the features of the portable communication device 104. The normalization is done in real time to match the properties of both the images to verify the user 102. In an example, the image stored on the user profile may be captured with the camera having a resolution of 8 megapixels. The portable communication device 104 which captures the real-time image of the user 102 may be having a resolution of 21 megapixels. The images are then normalized to an equal value to verify the identity of the user 102.

In an embodiment of the present disclosure, the financial asset system 112 maps the real-time image of the user 102 with the plurality of images present on the one or more web-based platform. The financial asset system 112 searches the one or more web based platform to find image to be mapped and analyzed with the real-time image of the user 102. The financial asset system 112 maps the image to verify the user 102.

Figure 2A:
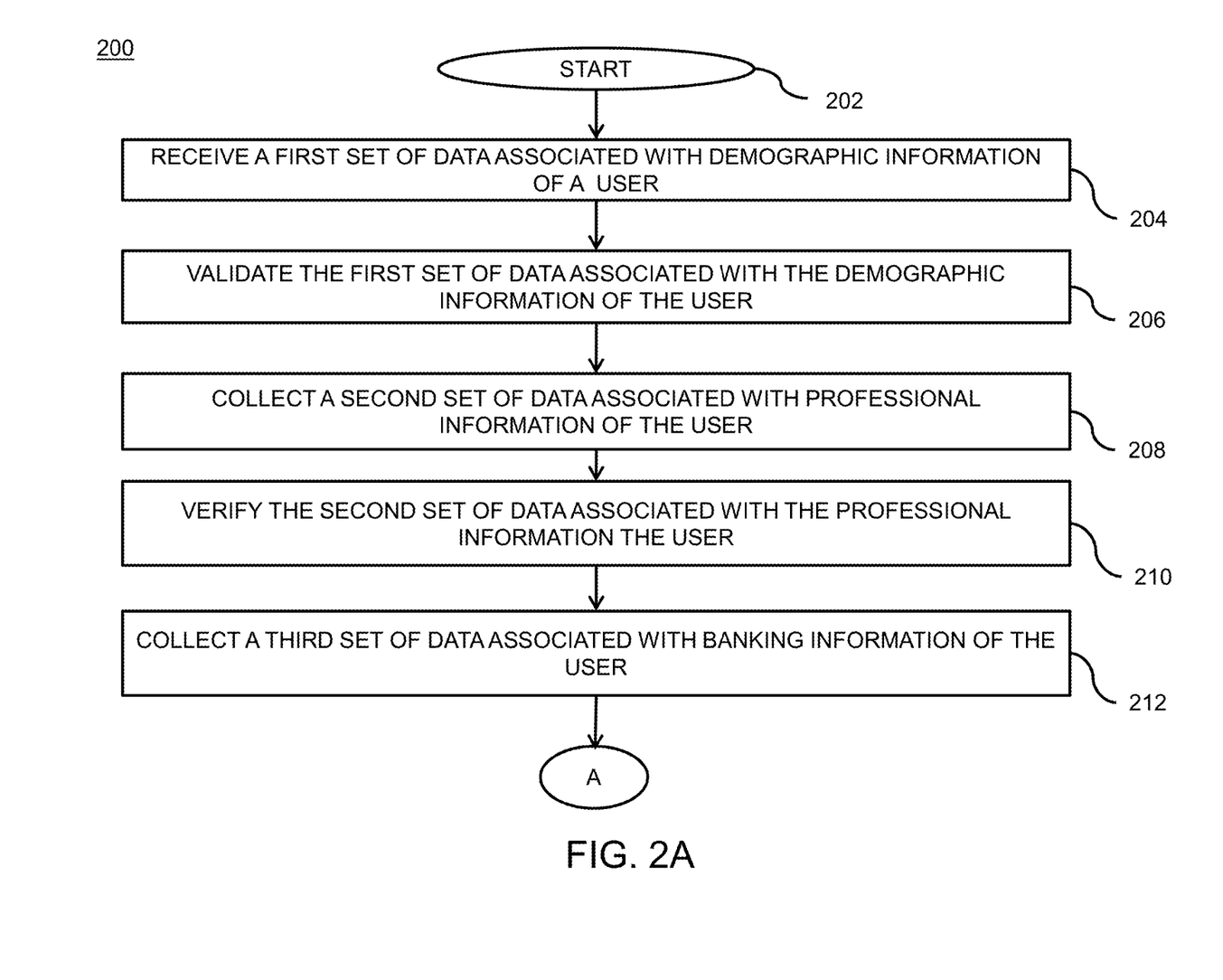
FIG. 2A and FIG. 2B illustrate a flow chart for providing the financial asset to the user, in accordance with various embodiments of the present disclosure.
Figure 2B:
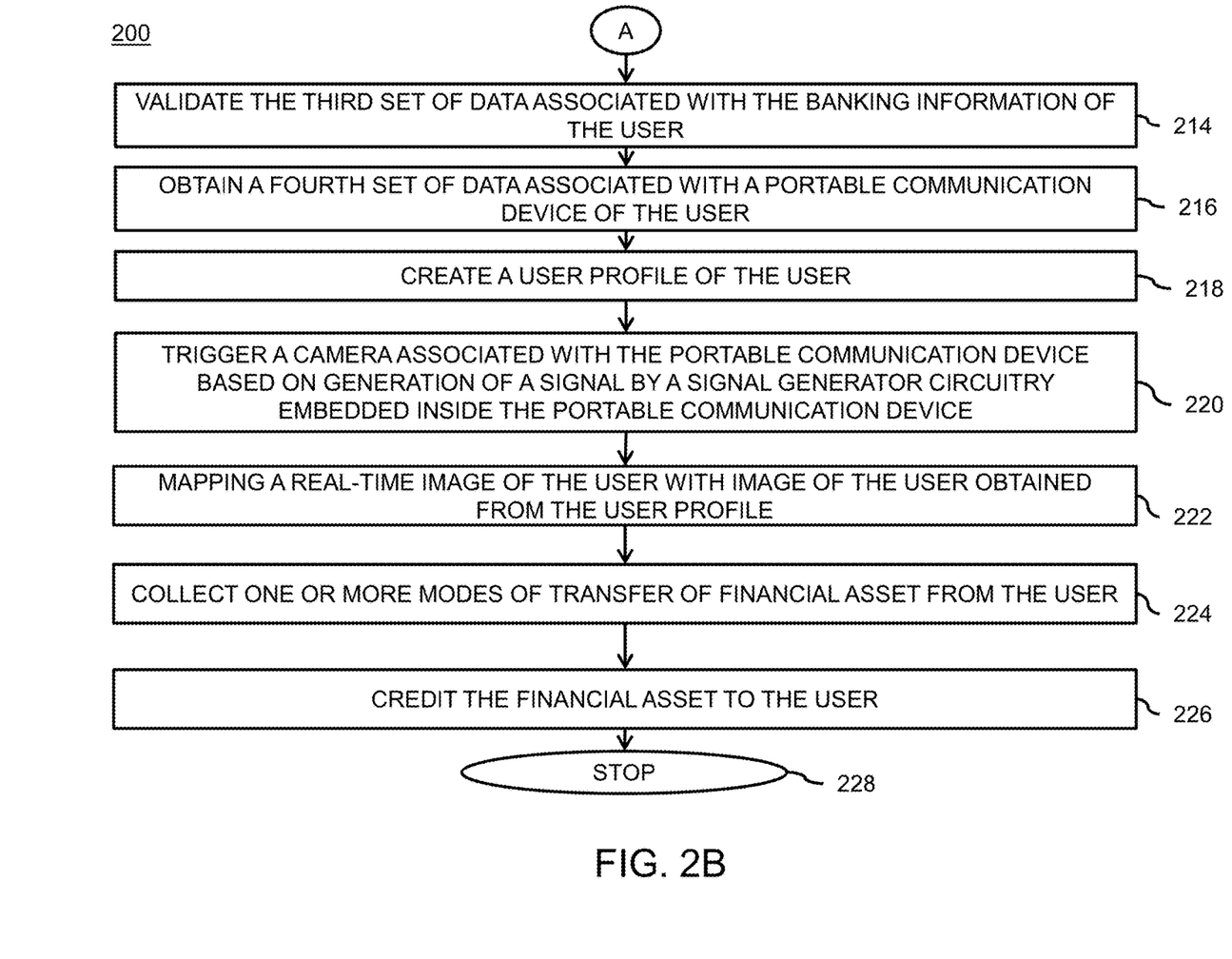

FIG. 2A and FIG. 2B illustrates a flow chart 200 for providing a financial asset to the user 102, in accordance with various embodiments of the present disclosure. It may be noted that to explain the process steps of flowchart 200, references will be made to the system elements of FIG. 1. It may also be noted that the flowchart 200 may have lesser or more number of steps.

The flowchart 200 initiates at step 202. Following step 202, at step 204, the financial asset system 112 receives the first set of data associated with the demographic information of the user 102. At step 206, the financial asset system 112 validates the first set of data associated with the user 102 by mapping the demographic information of the user 102 with the data of the user 102 available on the one or more web-based platform. At step 208, the financial asset system 112 collects the second set of data associated with the professional information of the user 102. At step 210, the financial asset system 112 verifies the second set of data associated with the user 102 by mapping the professional information of the user 102 with the data of the user 102 available on the one or more web-based platform. At step 212, the financial asset system 112 collects the third set of data associated with banking information of the user. At step 214, the financial asset system 112 validates the third set of data associated with the user 102 by mapping the banking information of the user 102 with the data of the user 102 available on the one or more web-based platform. At step 216, the financial asset system 112 obtains the fourth set of data associated with the portable communication device 104 of the user 102. At step 218, the financial asset system 112 creates the user profile of the user 102 based on the verification of the first set of data, the second set of data, the third set of data and the fourth set of data. At step 220, the financial asset system 112 triggers the camera associated with the portable communication device 104 based on generation of the signal by the signal generator circuitry 106 embedded inside the portable communication device 104. At step 222, the financial asset system 112 maps the real-time image of the user 102 with image of the user 102 obtained from the user profile. At step 224, the financial asset system 112 collects one or more modes of transfer of the financial asset from the user 102. At step 226, the financial asset system 112 credits the financial asset to the user 102 based on the collected data associated with the one or more modes of transfer of the financial asset. The flow chart 200 terminates at step 228.

Figure 3:
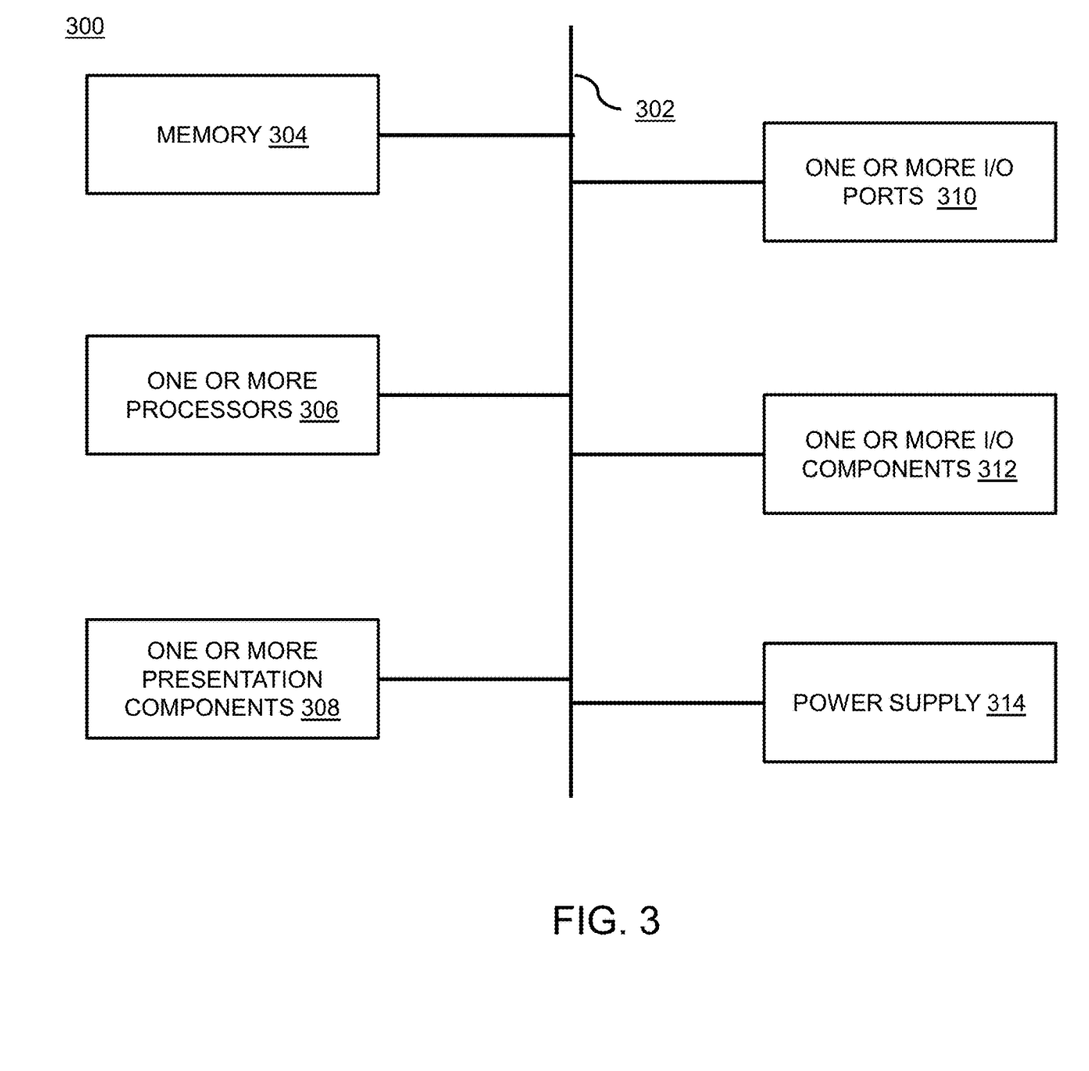
FIG. 3 illustrates a block diagram of a computing device, in accordance with various embodiments of the present disclosure.

FIG. 3 illustrates a block diagram of a computing device 300, in accordance with various embodiments of the present disclosure. The computing device 300 includes a bus 302 that directly or indirectly couples the following devices: memory 304, one or more processors 306, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for sake of clarity, in reality, delineating various components is not so clear, and metaphorically, the lines would more accurately be grey and fuzzy. For example, one may consider a presentation component such as a display device to be an I/O component. Also, processors have memory. FIG. 3 is merely illustrative of an exemplary computing device 300 may be used in connection with one or more embodiments of the present disclosure. Distinction is not made between such categories as workstation, server, laptop, hand-held device and the like, as all are contemplated within the scope of FIG. 3 and reference to "the computing device 300."

The computing device 300 typically includes a computer-readable media. The computer-readable media can be any available media that can be accessed by the computing device 300 and includes both volatile and nonvolatile media, removable and non-removable media. By way of example, and not limitation, the computer-readable media may comprise computer storage media and communication media. The computer storage media includes the volatile and the nonvolatile, the removable and the non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 300. The communication media typically embodies the computer-readable instructions, the data structures, the program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, the communication media includes wired media such as a wired network or direct-wired connection, and wireless media such as acoustic, RF, infrared and other wireless media. Combinations of any of the above should also be included within the scope of the computer readable media.

Memory 304 includes the computer-storage media in the form of volatile and/or nonvolatile memory. The memory 304 may be removable, non-removable, or a combination thereof. Exemplary hardware devices include solid-state memory, hard drives, optical-disc drives and the like. The computing device 300 includes the one or more processors to read data from various entities such as memory 304 or I/O components 312. The one or more presentation components 308 present data indications to a user or other device. Exemplary presentation components include a display device, speaker, printing component, vibrating component and the like. The one or more I/O ports 310 allow the computing device 300 to be logically coupled to other devices including the one or more I/O components 312, some of which may be built in. Illustrative components include a microphone, joystick, game pad, satellite dish, scanner, printer, wireless device and the like.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed:

1. An computer-implemented method for providing one or more modes of transfer of financial asset to a user based on verification of profile of the user, the computer-implemented method comprising:

receiving, at a financial asset system with a processor, a first set of data associated with demographic information of the user, wherein the first set of data is received from a mobile application installed inside a portable communication device in real time, wherein the portable communication device is associated with the user;

validating, at the financial asset system with the processor, the first set of data associated with the demographic information of the user, wherein the financial asset system validates the first set of data by mapping the first set of data with data of the user obtained from one or more web based platform, wherein the validation of the first set of data associated with the demographic information of the user is done in real time;

collecting, at the financial asset system with the processor, a second set of data associated with professional information of the user, wherein the financial asset system collects the second set of data from the mobile application installed inside the portable communication device, wherein the portable communication device is associated with the user;

verifying, at the financial asset system with the processor, the second set of data associated with the user, wherein the financial asset system verifies the second set of data by mapping the second set of data with the data of the user obtained from the one or more web based platform, wherein the verification of the second set of data associated with the user is done in real time;

collecting, at the financial asset system with the processor, a third set of data associated with the user, wherein the third set of data is associated with banking information of the user, wherein the financial asset system collects the third set of data from the mobile application installed inside the portable communication device, wherein the portable communication device is associated with the user;

validating, at the financial asset system with the processor, the third set of data associated with the user, wherein the financial asset system validates the third set of data by mapping the third set of data with the data of the user obtained from the one or more web based platform, wherein the validation of the third set of data associated with the user is done in real time;

obtaining, at the financial asset system with the processor, a fourth set of data associated with the portable communication device of the user, wherein the financial asset system obtains the fourth set of data to determine financial status of the user in real time, wherein the fourth set of data comprises device model, processor, RAM, operating system, IMEI number, IP address, MAC address and GPS data associated with the portable communication device of the user;

creating, at the financial asset system with the processor, the user profile of the user, wherein the financial asset system creates the user profile based on the first set of data, the second set of data, the third set of data, the fourth set of data and the data of the user obtained from the one or more web based platform, wherein the user profile is created in real time;

triggering, at the financial asset system with the processor, a camera associated with the portable communication device based on generation of a signal by a signal generator circuitry embedded inside the portable communication device, wherein the financial asset system triggers the camera after the verification of the third set of data and the fourth set of data for capturing a real-time image of the user;

mapping, at the financial asset system with the processor, the real-time image of the user with image of the user obtained from the user profile, wherein the financial asset system maps the real-time image of the user with image of the user obtained from the user profile in real time for verifying the user, wherein the image of the user obtained from the user profile is selected from a plurality of images from the one or more web based platform, wherein the image of the user is selected based on selection of images clicked from front camera of the portable communication device, exclusion of one or more images clicked in low light, normalizing a plurality of parameters associated with specifications related to the camera of the portable communication device for matching quality of the real time image and the image of the user obtained from the user profile, wherein the image of the user obtained from the user profile is an image clicked with a camera with specifications similar to the camera of the portable communication device used for clicking the real time image of the user;

collecting, at the financial asset system with the processor, the one or more modes of transfer of the financial asset from the user, wherein the one or more modes of transfer is collected after the verification of the user and approval of the financial asset, wherein the one or more modes of transfer of the financial asset is collected from the mobile application installed inside the portable communication device, wherein the portable communication device is associated with the user; and crediting, at the financial asset system with the processor, the financial asset to the user, wherein the financial asset system credits the financial asset based on collected data associated with the one or more modes of transfer of the financial asset.

2. The computer-implemented method as recited in claim 1, wherein the first set of data comprises the demographic information of the user, wherein the demographic information comprises name, last name, age, gender, father name, mother name, mobile number, address, e-mail address, and nationality of the user.

3. The computer-implemented method as recited in claim 1, wherein the second set of data is associated with the professional information of the user, wherein the professional information comprises occupation, current designation, company details, salary details, experience and passport information associated with the user.

4. The computer-implemented method as recited in claim 1, wherein the third set of data is associated with the banking information of the user, wherein the banking information comprises bank account details, number of bank accounts associated with the user, number of credit cards, number of debit cards, value of financial asset required by the user, rate of interest, and time duration of repayment of the financial asset.

5. The computer-implemented method as recited in claim 1, further comprising identifying, at the financial asset system with the processor, one or more user connected devices based on the fourth set of data associated with the portable communication device, wherein the identification is done in real time.

6. The computer-implemented method as recited in claim 1, further comprising analyzing, at the financial asset system with the processor, one or more user connected devices and the fourth set of data, wherein the financial asset system analyses the one or more user connected devices and the fourth set of data to identify financial status of the user, wherein the financial status is identified for approval of the financial asset to the user.

7. The computer-implemented method as recited in claim 1, further comprising normalizing, at the financial asset system with the processor, image obtained from the user profile or the real time image, wherein the normalization is done based on features of the portable communication device, wherein the normalizing is done in real time.

8. A computer system comprising:
one or more processors; and
a memory coupled to the one or more processors, the memory for storing instructions which, when executed by the one or more processors, cause the one or more processors to perform a method for providing one or more modes of transfer of financial asset to a user based on verification of a user profile, the method comprising:
receiving, at a financial asset system, a first set of data associated with demographic information of the user, wherein the first set of data is received from a mobile application installed inside a portable communication device in real time, wherein the portable communication device is associated with the user;
validating, at the financial asset system, the first set of data associated with the demographic information of the user, wherein the financial asset system validates the first set of data by mapping the first set of data with data of the user obtained from one or more web based platform, wherein the validation of the first set of data associated with the demographic information of the user is done in real time;
collecting, at the financial asset system, a second set of data associated with professional information of the user, wherein the financial asset system collects the second set of data from the mobile application installed inside the portable communication device, wherein the portable communication device is associated with the user;
verifying, at the financial asset system, the second set of data associated with the user, wherein the financial asset system verifies the second set of data by mapping the second set of data with the data of the user obtained from the one or more web based platform, wherein the verification of the second set of data associated with the user is done in real time;
collecting, at the financial asset system, a third set of data associated with the user, wherein the third set of data is associated with banking information of the user, wherein the financial asset system collects the third set of data from the mobile application installed inside the portable communication device, wherein the portable communication device is associated with the user;
validating, at the financial asset system, the third set of data associated with the user, wherein the financial asset system validates the third set of data by mapping the third set of data with the data of the user obtained from the one or more web based platform, wherein the validation of the third set of data associated with the user is done in real time;
obtaining, at the financial asset system, a fourth set of data associated with the portable communication device of the user, wherein the financial asset system obtains the fourth set of data to determine financial status of the user in real time, wherein the fourth set of data comprises device model, processor, RAM, operating system, IMEI number, IP address, MAC address and GPS data associated with the portable communication device of the user;
creating, at the financial asset system, the user profile of the user, wherein the financial asset system creates the user profile based on the first set of data, the second set of data, the third set of data, the fourth set of data and the data of the user obtained from the one or more web based platform, wherein the user profile is created in real time;
triggering, at the financial asset system, a camera associated with the portable communication device based on generation of a signal by a signal generator circuitry embedded inside the portable communication device, wherein the financial asset system triggers the camera after the verification of the third set of data and the fourth set of data for capturing a real-time image of the user;
mapping, at the financial asset system, the real-time image of the user with image of the user obtained from the user profile, wherein the financial asset system maps the real-time image of the user with image of the user obtained from the user profile in real time for verifying the user, wherein the image of the user obtained from the user profile is selected from a plurality of images from the one or more web based platform, wherein the image of the user is selected based on selection of images clicked from front camera of the portable communication device, exclusion of one or more images clicked in low light, normalizing a plurality of parameters associated with specifications related to the camera of the portable communication device for matching quality of the real time image and the image of the user obtained from the user profile, wherein the image of the user obtained from the user profile is an image clicked with a camera with specifications similar to the camera of the portable communication device used for clicking the real time image of the user;
collecting, at the financial asset system, the one or more modes of transfer of the financial asset from the user, wherein the one or more modes of transfer is collected after verification of the user and approval of the financial asset, wherein the one or more modes of transfer of the financial asset is collected from the mobile application installed inside the portable communication device, wherein the portable communication device is associated with the user; and
crediting, at the financial asset system, the financial asset to the user, wherein the financial asset system credits the financial asset based on collected data associated with the one or more modes of transfer of the financial asset.

9. The computer system as recited in claim 8, wherein the first set of data comprises the demographic information of the user, wherein the demographic information comprises name, last name, age, gender, father name, mother name, mobile number, address, e-mail address, and nationality of the user.

10. The computer system as recited in claim 8, wherein the second set of data is associated with the professional information of the user, wherein the professional information comprises occupation, current designation, company details, salary details, experience and passport information associated with the user.

11. The computer system as recited in claim 8, wherein the third set of data is associated with the banking information of the user, wherein the banking information comprises bank account details, number of bank accounts associated with the user, number of credit cards, number of debit cards, value of financial asset required by the user, rate of interest, and time duration of repayment of the financial asset.

12. The computer system as recited in claim 8, further comprising identifying, at the financial asset system, one or more user connected devices based on the fourth set of data associated with the portable communication device, wherein the identification is done in real time.

13. The computer system as recited in claim 8, further comprising analyzing, at the financial asset system, the one or more user connected devices and the fourth set of data, wherein the financial asset system analyses the one or more user connected devices and the fourth set of data to identify financial status of the user.

14. The computer system as recited in claim 8, further comprising normalizing, at the financial asset system, image obtained from the user profile or the real time image, wherein the normalization is done based on features of the portable communication device, wherein the normalizing is done in real time.

15. A non-transitory computer-readable storage medium encoding computer executable instructions that, when executed by at least one processor, performs a method for providing one or more modes of transfer of financial asset to a user based on verification of a user profile, the method comprising:
- receiving, at a computing device, a first set of data associated with demographic information of the user, wherein the first set of data is received from a mobile application installed inside a portable communication device in real time, wherein the portable communication device is associated with the user;
- validating, at the computing device, the first set of data associated with the demographic information of the user, wherein the validation is done by mapping the first set of data with data of the user obtained from one or more web based platform, wherein the validation is done in real time;
- collecting, at the computing device, a second set of data associated with professional information of the user, wherein the second set of data is collected from the mobile application installed inside the portable communication device, wherein the portable communication device is associated with the user;
- verifying, at the computing device, the second set of data associated with the user, wherein the verification is done by mapping the second set of data with the data of the user obtained from the one or more web based platform, wherein the verification is done in real time;
- collecting, at the computing device, a third set of data associated with the user, wherein the third set of data is associated with banking information of the user, wherein the third set of data is collected from the mobile application installed inside the portable communication device, wherein the portable communication device is associated with the user;
- validating, at the computing device, the third set of data associated with the user, wherein the validation is done by mapping the third set of data with the data of the user obtained from the one or more web based platform, wherein the validation is done in real time;
- obtaining, at the computing device, a fourth set of data associated with the portable communication device of the user, wherein the fourth set of data is obtained to determine financial status of the user in real time, wherein the fourth set of data comprises device model, processor, RAM, operating system, IMEI number, IP address, MAC address and GPS data associated with the portable communication device of the user;
- creating, at the computing device, the user profile of the user, wherein the user profile is created based on the first set of data, the second set of data, the third set of data, the fourth set of data and the data of the user obtained from the one or more web based platform, wherein the user profile is created in real time;
- triggering, at the computing device, a camera associated with the portable communication device based on generation of a signal by a signal generator circuitry embedded inside the portable communication device, wherein the camera is triggered after the verification of the third set of data and the fourth set of data for capturing a real-time image of the user;
- mapping, at the computing device, the real-time image of the user with image of the user obtained from the user profile, wherein the mapping is done in real time for verifying the user, wherein the image of the user obtained from the user profile is selected from a plurality of images from the one or more web based platform, wherein the image of the user is selected based on selection of images clicked from front camera of the portable communication device, exclusion of one or more images clicked in low light, normalizing a plurality of parameters associated with specifications related to the camera of the portable communication device for matching quality of the real time image and the image of the user obtained from the user profile, wherein the image of the user obtained from the user profile is an image clicked with a camera with specifications similar to the camera of the portable communication device used for clicking the real time image of the user;
- collecting, at the computing device, the one or more modes of transfer of the financial asset from the user, wherein the one or more modes of transfer is collected after verification of the user and approval of the financial asset, wherein the one or more modes of transfer of the financial asset is collected from the mobile application installed inside the portable communication device, wherein the portable communication device is associated with the user; and
- crediting, at the computing device, the financial asset to the user, wherein the financial asset is credited based on collected data associated with the one or more modes of transfer of the financial asset.

16. The non-transitory computer-readable storage medium as recited in claim 15, wherein the first set of data comprises the demographic information of the user, wherein the demographic information comprises name, last name, age, gender, father name, mother name, mobile number, address, e-mail address, and nationality of the user.

17. The non-transitory computer-readable storage medium as recited in claim 15, wherein the second set of data is associated with the professional information of the user, wherein the professional information comprises occupation, current designation, company details, salary details, experience and passport information associated with the user.

18. The non-transitory computer-readable storage medium as recited in claim 15, wherein the third set of data is associated with the banking information of the user, wherein the banking information comprises bank account details, number of bank accounts associated with the user, number of credit cards, number of debit cards, value of financial asset required by the user, rate of interest, and time duration of repayment of the financial asset.

* * * * *